US011327674B2

(12) United States Patent
Resch et al.

(10) Patent No.: US 11,327,674 B2
(45) Date of Patent: *May 10, 2022

(54) STORAGE VAULT TIERING AND DATA MIGRATION IN A DISTRIBUTED STORAGE NETWORK

(71) Applicant: International Business Machines Corporation, Armonk, NY (US)

(72) Inventors: Jason K. Resch, Chicago, IL (US); Wesley B. Leggette, Chicago, IL (US)

(73) Assignee: Pure Storage, Inc., Mountain View, CA (US)

(*) Notice: Subject to any disclaimer, the term of this patent is extended or adjusted under 35 U.S.C. 154(b) by 588 days.

This patent is subject to a terminal disclaimer.

(21) Appl. No.: 15/819,810

(22) Filed: Nov. 21, 2017

(65) Prior Publication Data

US 2018/0095696 A1 Apr. 5, 2018

Related U.S. Application Data

(63) Continuation-in-part of application No. 13/869,655, filed on Apr. 24, 2013, now Pat. No. 10,178,083.

(Continued)

(51) Int. Cl.
*G06F 3/06* (2006.01)
*G06F 16/11* (2019.01)
(Continued)

(52) U.S. Cl.
CPC ............ *G06F 3/0647* (2013.01); *G06F 3/061* (2013.01); *G06F 3/067* (2013.01); *G06F 3/0619* (2013.01);
(Continued)

(58) Field of Classification Search
CPC ............... G06F 16/119; G06F 16/1873; G06F 11/1076; G06F 21/33; G06F 21/57;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Miranda Le
(74) *Attorney, Agent, or Firm* — Garlick & Markison; Timothy W. Markison; Harry S. Tyson, Jr.

(57) ABSTRACT

Methods for use in a dispersed storage network (DS) to determine appropriate resources for storing data. An example method, implemented by one or more devices of a dispersed storage network (DSN), includes obtaining storage characteristics relating to data stored in a first pool of storage units associated with a first storage tier, the data stored as a set of encoded data slices. Based on the storage characteristics, the method determines to move the data to a target storage pool of storage units associated with a second storage tier. The method also determines whether to re-encode the data for storage in the target storage pool of storage units. When not re-encoding the data, the method includes retrieving the set of encoded data slices, translating associated slice names into translated slice names, and facilitating storage of the encoded data slices in the target storage pool utilizing the translated slice names.

17 Claims, 7 Drawing Sheets

Related U.S. Application Data

(60) Provisional application No. 61/655,736, filed on Jun. 5, 2012.

(51) Int. Cl.
| | | |
|---|---|---|
| *G06F 11/10* | (2006.01) | |
| *H04L 29/06* | (2006.01) | |
| *G06F 21/57* | (2013.01) | |
| *G06F 21/60* | (2013.01) | |
| *G06F 21/33* | (2013.01) | |
| *G06F 16/18* | (2019.01) | |

(52) U.S. Cl.
CPC ........ *G06F 11/1076* (2013.01); *G06F 16/119* (2019.01); *G06F 16/1873* (2019.01); *G06F 21/33* (2013.01); *G06F 21/57* (2013.01); *G06F 21/604* (2013.01); *H04L 63/0823* (2013.01); *H04L 63/101* (2013.01); *G06F 3/0608* (2013.01); *G06F 3/0611* (2013.01)

(58) Field of Classification Search
CPC ...... G06F 21/604; G06F 3/067; G06F 3/0619; G06F 3/061; G06F 3/0611; G06F 3/0608; G06F 3/0647; H04L 63/0823; H04L 63/101
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 6,898,667 B2* | 5/2005 | Umberger ............. | G06F 3/0608 711/114 |
| 6,978,366 B1 | 12/2005 | Ignatchenko et al. | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,225,263 B1 | 5/2007 | Clymer et al. | |
| 7,240,236 B2 | 7/2007 | Cutts et al. | |
| 7,272,613 B2 | 9/2007 | Sim et al. | |
| 7,418,649 B2* | 8/2008 | Li ..................... | H03M 13/1575 375/260 |
| 7,457,835 B2* | 11/2008 | Toebes ................ | H04L 67/1095 |
| 7,533,133 B1 | 5/2009 | Lanzatella et al. | |
| 7,581,156 B2 | 8/2009 | Manasse | |
| 7,607,063 B2 | 10/2009 | Kikuchi et al. | |
| 7,636,724 B2 | 12/2009 | de la Torre et al. | |
| 7,680,822 B1 | 3/2010 | Vyas et al. | |
| 7,743,275 B1* | 6/2010 | Tormasov ............ | G06F 11/1076 714/6.12 |
| 7,831,793 B2* | 11/2010 | Chakravarty ........ | G06F 11/1451 711/165 |
| 7,865,673 B2* | 1/2011 | Moore .................. | G06F 3/0644 711/154 |
| 7,925,666 B1 | 4/2011 | Johnson et al. | |
| 7,945,639 B2 | 5/2011 | Gavrilov et al. | |
| 8,051,362 B2* | 11/2011 | Li ....................... | G06F 11/1076 714/776 |
| 8,145,818 B2 | 3/2012 | Murayama et al. | |
| 8,214,590 B2* | 7/2012 | Ulrich .................... | G06F 3/061 711/114 |
| 8,281,404 B2 | 10/2012 | Frey et al. | |
| 8,381,024 B2* | 2/2013 | Turner ................. | G06F 11/1076 714/4.11 |
| 8,406,421 B2 | 3/2013 | Kamen et al. | |
| 8,429,514 B1* | 4/2013 | Goel ....................... | G06F 12/00 714/758 |
| 8,433,849 B2* | 4/2013 | De Schrijver ....... | G06F 11/2094 711/114 |
| 8,620,879 B2 | 12/2013 | Cairns | |
| 8,694,467 B2 | 4/2014 | Sun | |
| 8,713,405 B2* | 4/2014 | Healey, Jr ............. | G06F 3/064 714/763 |
| 8,856,530 B2 | 10/2014 | Patti et al. | |
| 8,862,837 B1* | 10/2014 | Marshak ............. | G06F 12/0868 711/154 |
| 8,914,632 B1 | 12/2014 | Shankar et al. | |
| 8,918,478 B2* | 12/2014 | Ozzie ................... | G06F 11/1004 709/217 |
| 8,935,493 B1* | 1/2015 | Dolan .................... | G06F 3/0649 711/161 |
| 8,972,694 B1* | 3/2015 | Dolan .................... | G06F 3/0608 711/172 |
| 9,098,519 B2* | 8/2015 | Pavlov ................ | G06F 11/1076 |
| 9,235,350 B2 | 1/2016 | Mark | |
| 9,372,809 B2* | 6/2016 | Testardi .............. | G06F 11/1448 |
| 9,792,295 B1* | 10/2017 | Rus ........................ | G06F 16/182 |
| 9,811,262 B1* | 11/2017 | Rus ........................ | G06F 3/0643 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0210270 A1 | 9/2005 | Rohatgi et al. | |
| 2005/0229069 A1 | 10/2005 | Hassner et al. | |
| 2006/0041719 A1* | 2/2006 | Chui ..................... | G06F 12/0866 711/117 |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |

(56) References Cited

U.S. PATENT DOCUMENTS

| | | | |
|---|---|---|---|
| 2007/0079083 A1* | 4/2007 | Gladwin | G06F 21/6227 |
| | | | 711/154 |
| 2007/0088970 A1 | 4/2007 | Buxton et al. | |
| 2007/0113032 A1* | 5/2007 | Kameyama | G06F 11/1076 |
| | | | 711/162 |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2008/0235234 A1 | 9/2008 | Beedubail et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0218037 A1* | 8/2010 | Swartz | G06F 16/00 |
| | | | 714/6.12 |
| 2010/0299313 A1 | 11/2010 | Orsini et al. | |
| 2011/0029840 A1* | 2/2011 | Ozzie | H03M 13/05 |
| | | | 714/763 |
| 2011/0087948 A1 | 4/2011 | Murakami et al. | |
| 2011/0225202 A1 | 9/2011 | Man et al. | |
| 2012/0060072 A1* | 3/2012 | Simitci | H03M 13/373 |
| | | | 714/756 |
| 2012/0131683 A1 | 5/2012 | Nassar et al. | |
| 2013/0246470 A1 | 9/2013 | Price et al. | |
| 2015/0074216 A1* | 3/2015 | Park | H04L 67/10 |
| | | | 709/208 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; ITEF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

* cited by examiner

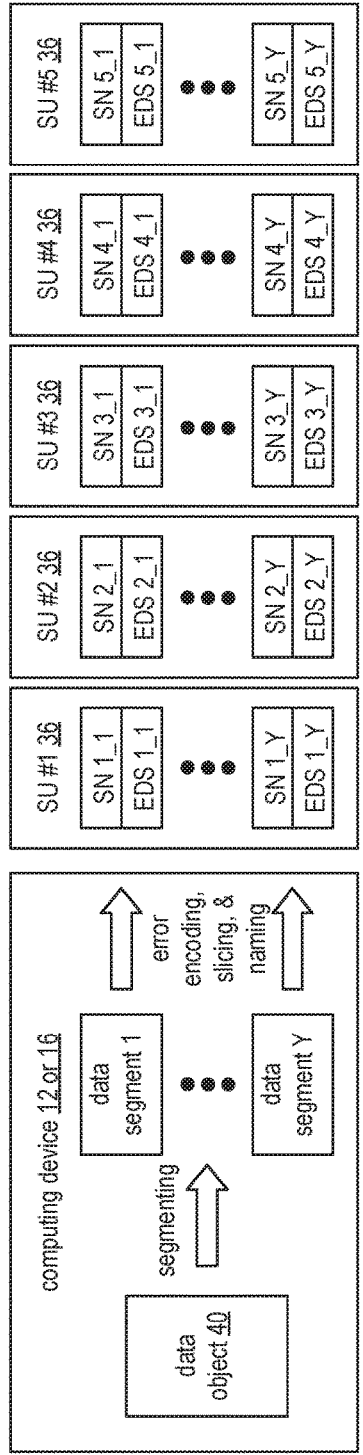
FIG. 3
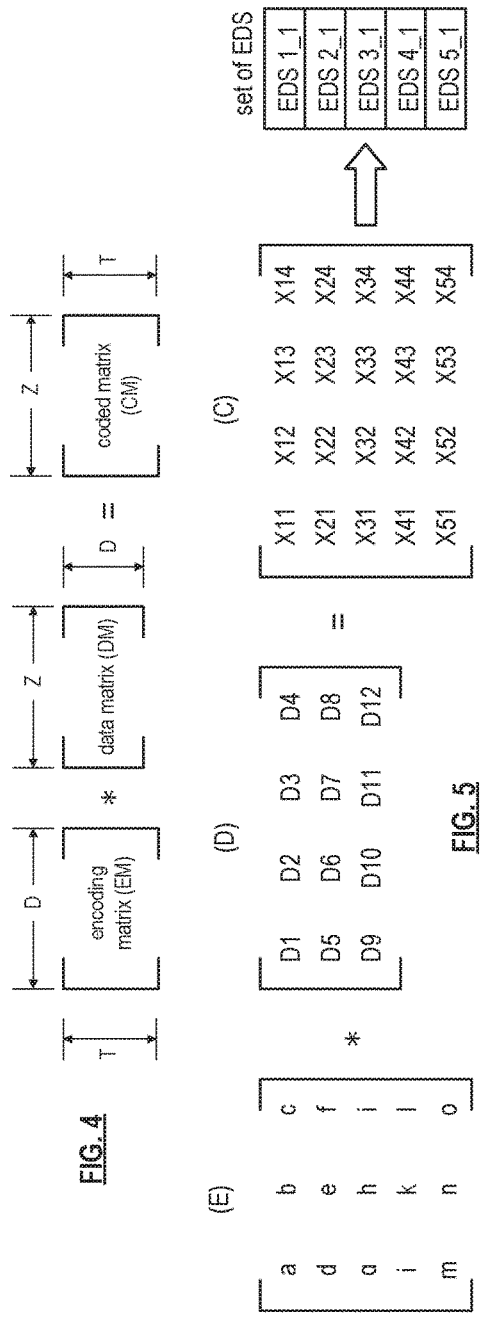
FIG. 4
FIG. 5
FIG. 6

STORAGE VAULT TIERING AND DATA MIGRATION IN A DISTRIBUTED STORAGE NETWORK

CROSS-REFERENCE TO RELATED APPLICATIONS

The present U.S. Utility Patent Application claims priority pursuant to 35 U.S.C. § 120 as a continuation-in-part of U.S. Utility application Ser. No. 13/869,655, entitled "UPDATING ACCESS CONTROL INFORMATION WITHIN A DISPERSED STORAGE UNIT," filed Apr. 24, 2013, which claims priority pursuant to 35 U.S.C. § 119(e) to U.S. Provisional Application No. 61/655,736, entitled "STORING DATA IN A LAYERED DISTRIBUTED STORAGE AND TASK NETWORK", filed Jun. 5, 2012, both of which are hereby incorporated herein by reference in their entirety and made part of the present U.S. Utility Patent Application for all purposes.

BACKGROUND

This invention relates generally to computer networks, and more specifically, to selection of storage resources in a dispersed storage network.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

SUMMARY

According to an embodiment of the present invention, storage characteristics are obtained, the storage characteristics relating to data stored in a first pool of storage units of a distributed storage network (DSN). The first pool of storage units is associated with a first storage tier, and the data is stored as a set of encoded data slices. Based on the storage characteristics, a determination is made to move the data to a target storage pool of storage units associated with a second storage tier. The data may be re-encoded, based on a further determination, for storage in the target storage pool of storage units. When not re-encoding the data, the set of encoded data slices is retrieved, and slice names associated with the data slices are translated into translated slice names. The encoded data slices are stored in the target storage pool utilizing the translated slice names. When re-encoding the data, a decode threshold number of encoded data slices is decoded to produce the data, which in turn is encoded for storage in the target storage pool using differing dispersed storage error coding function parameters.

BRIEF DESCRIPTION OF THE DRAWINGS

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

DETAILED DESCRIPTION

Figure 1:
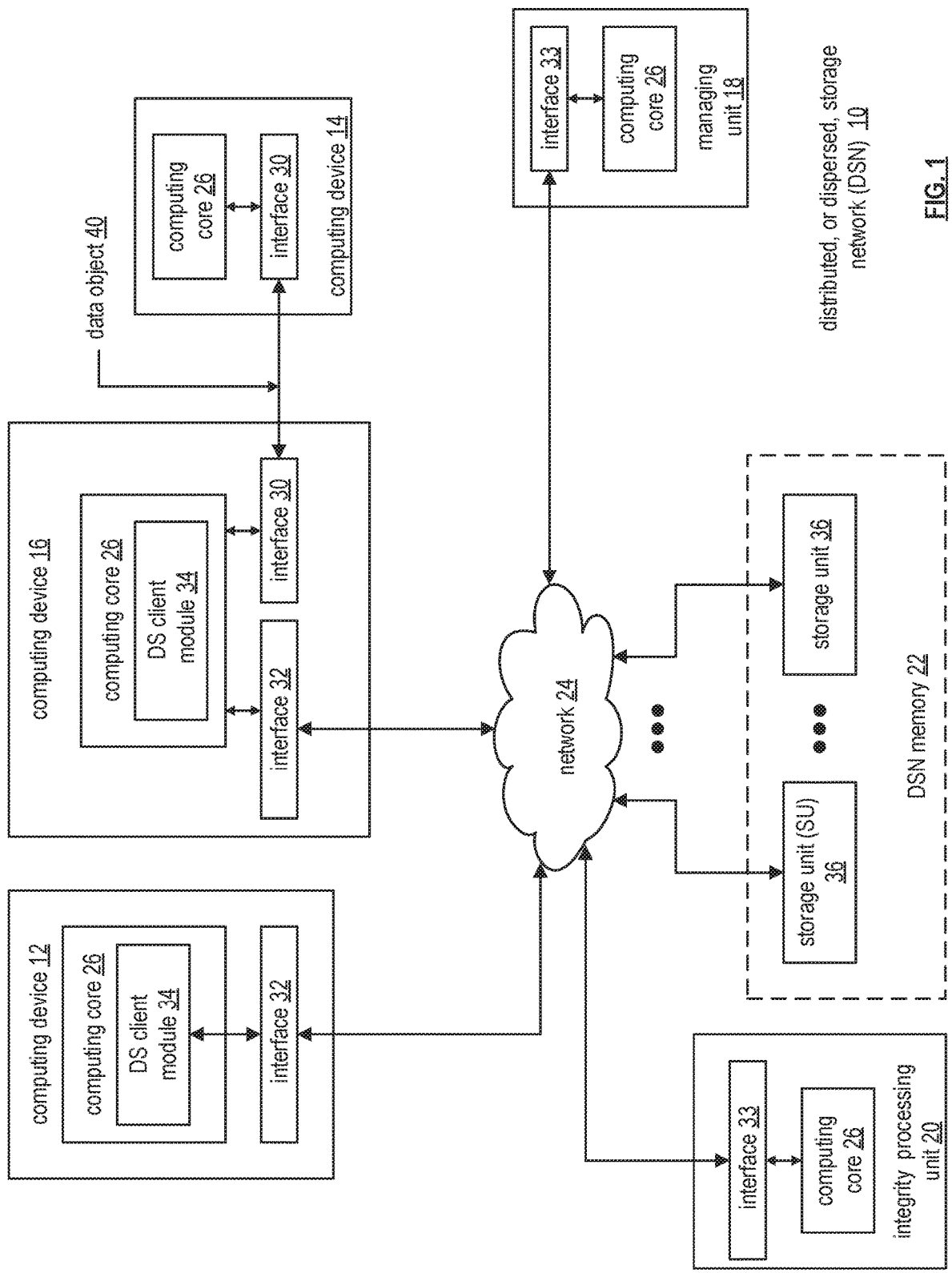
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
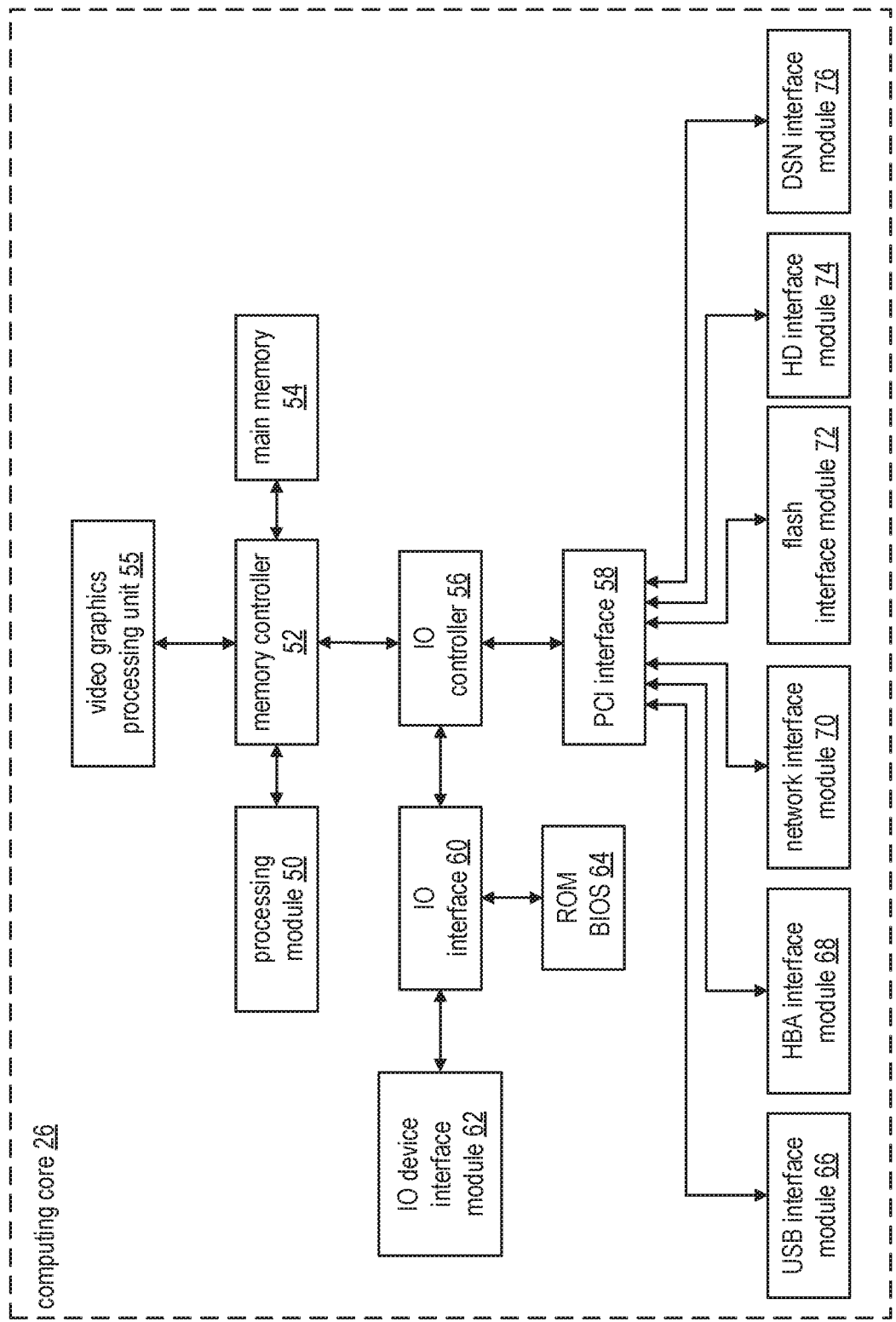
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more than or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, integrity processing unit 20 and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10. Examples of storage vault tiering, data migration, and dynamic resource selection for data access operations are discussed in greater detail with reference to FIGS. 9-11.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
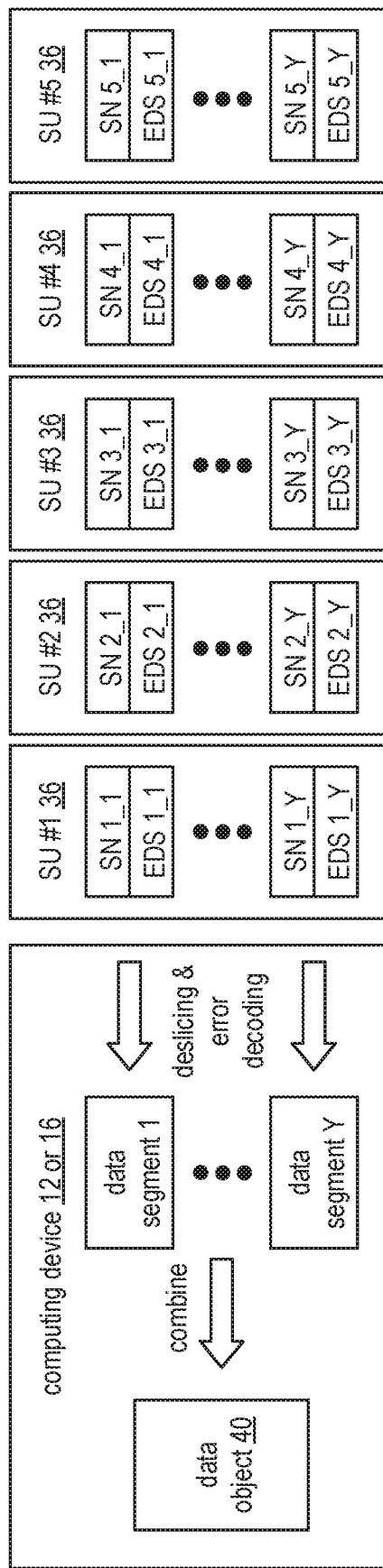
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
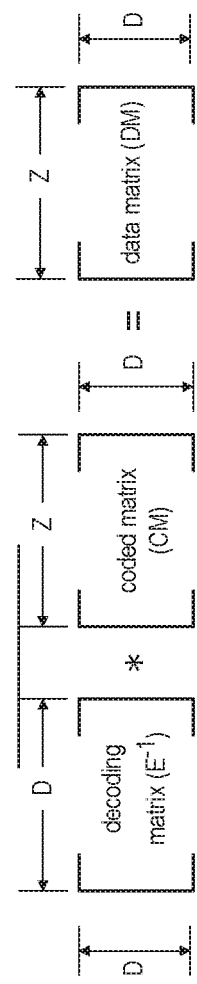
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In a dispersed storage network, it is natural for some stored data to be of greater importance and/or have different storage requirements than other stored data. Often, the relative importance of a given piece of data is a dynamic property that evolves over time. Likewise, the performance and reliability of storage units and sets of storage units may vary. Some storage sets may be of relatively high performance, while others may be more suitable for long-term reliable storage. Knowing the relative importance, size, frequency of access, etc. of data may be useful when determining appropriate resources for storing the data. As described more fully below in conjunction with the novel examples of FIGS. 9-11, differentiated levels of service within a DSN memory are enabled using rules and methods for data storage and migration based on, for example, delivered performance levels associated with storage tiers and a required performance level associated with the data.

Figure 9:
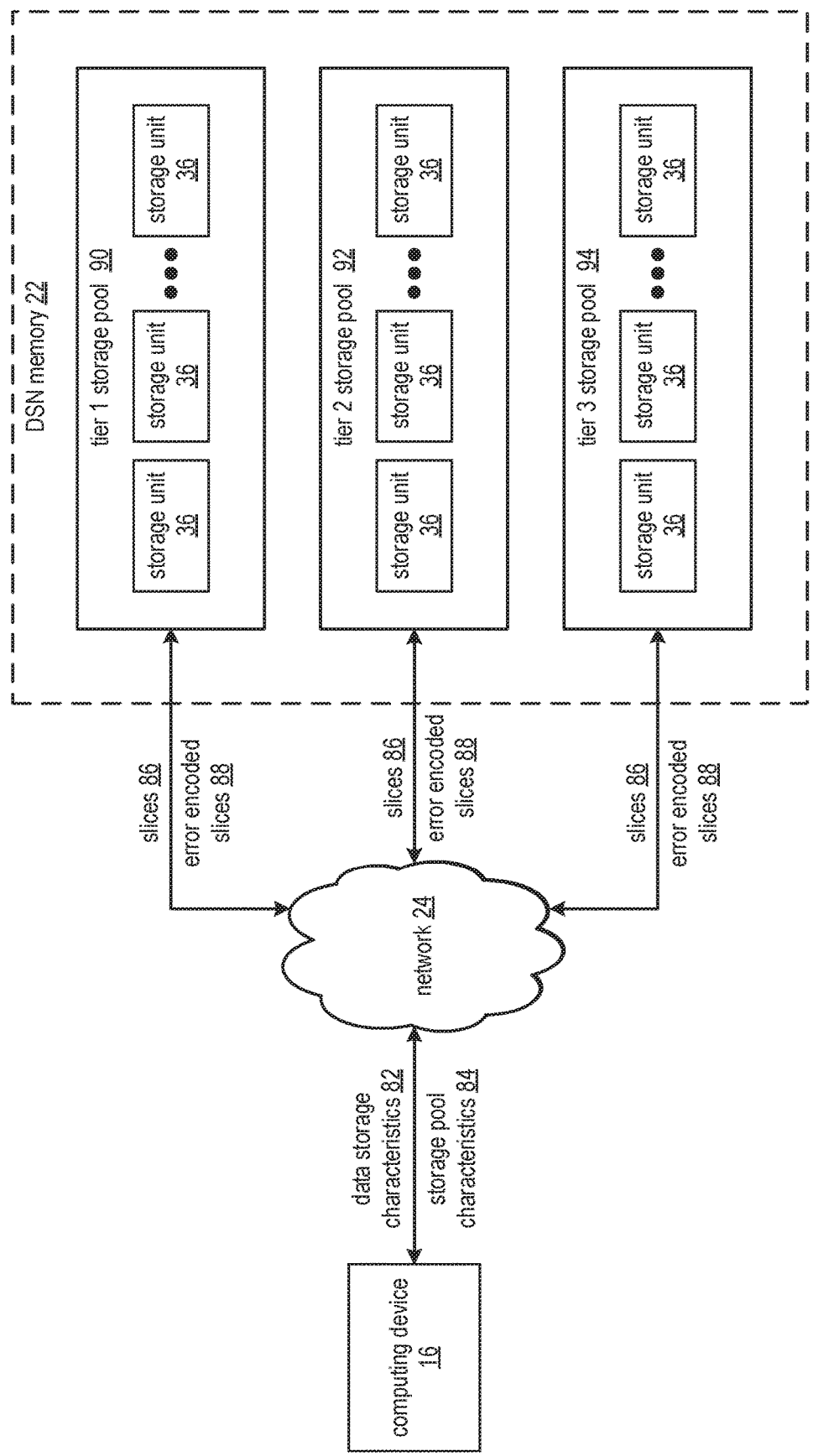
FIG. 9 is a schematic block diagram of an example of a DSN performing data migration in accordance an embodiment of the present disclosure.

FIG. 9 is a schematic block diagram of an example of a distributed storage network (DSN) performing data migration in accordance an embodiment of the present disclosure. The illustrated DSN includes a computing device 16, DSN memory 22, and the network 24 of FIG. 1. The illustrated DSN memory 22 includes a plurality of sets of storage units 36 (where, for example, 1-n storage units is in a set and n is an integer greater than or equal to three) arranged as storage pools as described more fully below. Each storage unit 36 may be implemented utilizing the storage unit 36 of FIG. 1, and each of the storage units 36 includes a DS client module 34/processing module and memory (not separately illustrated). The storage units 36 of a storage set may be located at a same physical location (site) or located at multiple physical locations without departing from the technology as described herein.

In general, DSN memory 22 stores a plurality of dispersed storage (DS) error encoded data. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

Referring more particularly to FIG. 9, the DSN memory 22 of the illustrated embodiment includes a plurality of tiered storage pools 90, 92, and 94 (e.g., tiers 1-3). Each storage pool of the plurality of tiered storage pools 90-94 includes a set of storage units 36 utilized to access at least one of data slices 86 and error coded data slices 88. Each storage pool of the plurality of tiered storage pools 90-94 is operably coupled via the network 24 to the plurality of tiered storage pools 90-94 to facilitate migrating data slices 86 and/or error coded data slices 88 (e.g., "slices"). Migration of slices may enable a more favorable match of a data storage performance level requirement and a target/actual storage performance level when at least one storage pool of the plurality of tiered storage pools 90-94 is associated with an actual storage performance level that is different than an actual storage performance level associated with at least one other storage pool. As described more fully below, computing device 16 utilizes data storage characteristics 82 and storage pool characteristics 84 relating to data stored in a storage tier.

In various examples, each storage pool may be associated with an actual performance level (also referred to as a "delivered performance level"), where the actual performance level includes one or more of an access latency level, an access bandwidth level, a cost level, a storage capacity level, a geographic affiliation, a security level, an availability level, etc. For example, the tier 1 storage pool 90 may be associated with an "active" storage tier requiring a target performance level that includes a relatively low access latency performance level and an average reliability level. As another example, the tier 3 storage pool 94 may be associated with an "inactive" storage tier requiring a target performance level that includes allowing a highest access latency performance level and mandating a highest reliability level. As yet another example, the tier 2 storage pool 92 may be associated with a "near line" storage tier requiring a target performance level including an average access latency performance level and an average reliability level.

From time to time, a determination may be made (e.g., by one or more of the storage unit 36, a computing device 16, a managing unit 18, etc.) whether to move slices from a first storage pool to a second storage pool to achieve a better match of required performance and delivered performance when a change is detected in required performance. For example, a determination is made to move slices from a storage pool associated with an active tier level of performance to a storage pool associated with a near line tier level of performance when a frequency of access of the slices falls below an active access threshold level. Detecting a change in required performance may be based on one or more of a storage pool utilization level (e.g., move data slices from a nearly full storage pool to a relatively underutilized storage pool), a number of slice accesses per unit of time (e.g., access frequency level), a timestamp associated with a last data slice access, a revised slice access quality of service goal, an estimated cost of moving slices, an actual quality of service level, etc. Detecting a change in required performance may include one or more of initiating a query, performing a performance test, monitoring historical performance information, detecting data access activity, and receiving a request.

It is noted that two or more of the plurality of tiered storage pools 90-94 may be part a common vault (e.g., a virtual memory block associated with a portion of an overall namespace of the DSN) within the DSN memory 22. Further, a given storage pool may consist of storage units which are relatively new, offer better performance or reliability, utilize speed-optimized communication links, etc. Additionally, one or more vaults or storage pools may be arranged or combined in various ways to provide different storage tiers (including storage tiers using differing dispersed storage error coding function parameters), with associated migration policies that guide movement of data between various storage tiers.

Figure 10:
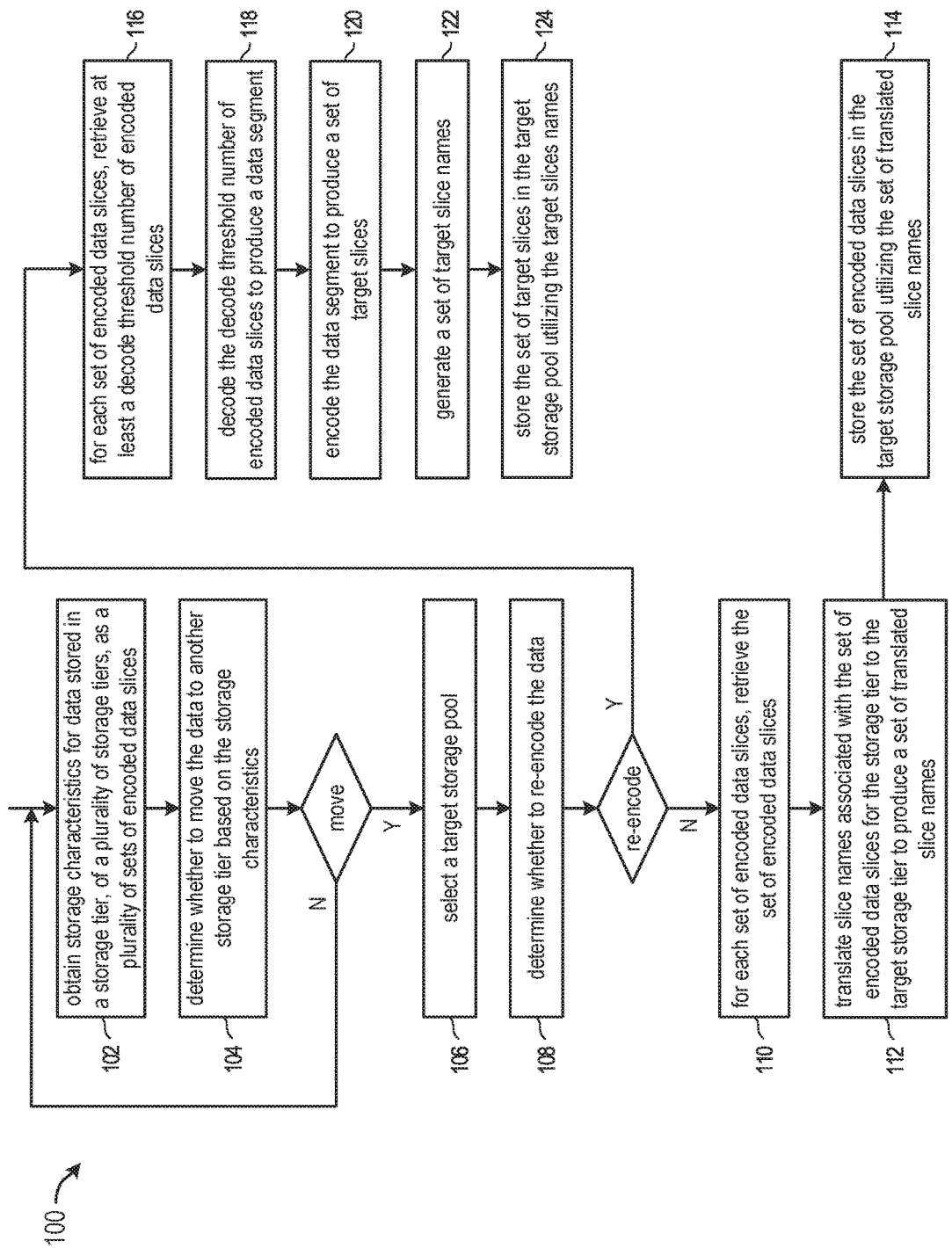
FIG. 10 is a flow diagram illustrating an example of migrating data slices in accordance with an embodiment of the present disclosure.

FIG. 10 is a flow diagram 100 illustrating an example of migrating data slices in accordance with an embodiment of the present disclosure. The method begins at step 102 where one or more processing modules of one or more computing devices (e.g., of a DS client module 34 of a computing device 16 or storage unit 36) obtains storage characteristics for data stored in a first pool of storage units associated with a first storage tier of a plurality of storage tiers as a plurality of sets of encoded data slices (e.g., slices and/or error coded data slices). The storage characteristics includes one or more of a present storage tier utilized to store the data, a delivered performance level associated with the present storage tier, and a required performance level associated with the data. Obtaining the storage characteristics includes one or more of a lookup, a query, a test, and detecting a change in the required performance level. The method continues at step 104 where the processing module determines whether to move the data to another storage pool, associated with another storage tier, based on the storage characteristics. Determining to move the data includes indicating to move the data when the delivered performance level associated with the present storage tier compares unfavorably to the required performance level associated with the data. The method loops back to step 102 when the processing module determines to not move the data. The method continues to step 106 when the processing module determines to move the data.

The method continues at step 106 where the processing module selects a target storage pool having a target storage tier. The selecting includes identifying a storage tier with an associated delivered performance level that more favorably matches the required performance level associated with the data. For example, the processing module identifies an "active" storage tier when the required performance level associated with the data better matches the active storage tier performance than a currently utilized storage tier. For instance, a change in required performance level may be detected when a higher access frequency is detected for the data, and a suitable active storage tier is available.

The method continues at step 108 where the processing module determines whether to re-encode the data. Determining whether to re-encode the data may be based on one or more of a storage capacity level of the target storage pool, a utilization level of the target storage pool, and a storage reliability requirement. For example, the processing module determines to re-encode the data when an above-average storage reliability requirement is detected. In another example, the processing module determines to re-encode the data when the dispersed storage error coding function parameters used to generate the encoded data slices differs from the parameters used to store data in the target storage pool (e.g., due to a differing number of storage units in the target storage pool). The method branches to step 116 when the processing module determines to re-encode the data. The method continues to step 110 when the processing module determines not to re-encode the data.

The method continues at step 110, where, for each set of encoded data slices, the processing module retrieves a set of encoded data slices (e.g., generates and sends a set of read slice requests to the storage tier). The method continues at step 112 where the processing module translates slice names associated with the set of encoded data slices from a present storage tier to the target storage tier to produce a set of translated slice names. Translating slice names may be based on one or more of dispersed storage error coding function parameters of the storage tier and dispersed storage error coding function parameters of the target storage tier. For example, the processing module changes a vault identifier (ID) to align the set of translated slice names with the target storage tier. The method continues at step 114 where the processing module facilitates storage (e.g., via write requests) of the set of encoded data slices in the target storage pool utilizing the set of translated slice names. In an example, facilitating storage of the data slices includes generating a set of write requests that includes the set of translated slice names and the set of encoded data slices and outputting the set of write requests to the target storage tier.

When the processing module determines to re-encode the data, the method continues at step 116, where, for each set of encoded data slices, the processing module retrieves at least a decode threshold number of encoded data slices. Retrieving the encoded data slices includes generating a set of read slice requests, outputting the set of read slice requests to the storage tier, and receiving at least the decode threshold number of encoded data slices in response. The method continues at step 118 where the processing module decodes the decode threshold number of encoded data slices to produce a data segment utilizing a first set of dispersed storage error coding function parameters associated with the storage tier.

The method continues at step 120 where the processing module encodes the data segment to produce a set of target data slices utilizing a second set of dispersed storage error coding function parameters associated with the target storage tier. The method continues at step 122 where the processing module generates a set of target slice names in accordance with the second set of dispersed storage error coding function parameters. Generating the set of target slice names can include, for example, utilizing a vault ID associated with the target storage tier and a slice index associated with a pillar width value of the vault. The method continues at step 124 where the processing module facilitates storage (e.g., via write requests) of the set of target data slices in the target storage pool utilizing the target slice names. Facilitating storage of the set of target data slices can include, for example, generating a set of write requests that includes the set of target slice names and a set of target data slices and outputting the set of write requests to the target storage tier.

Figure 11:
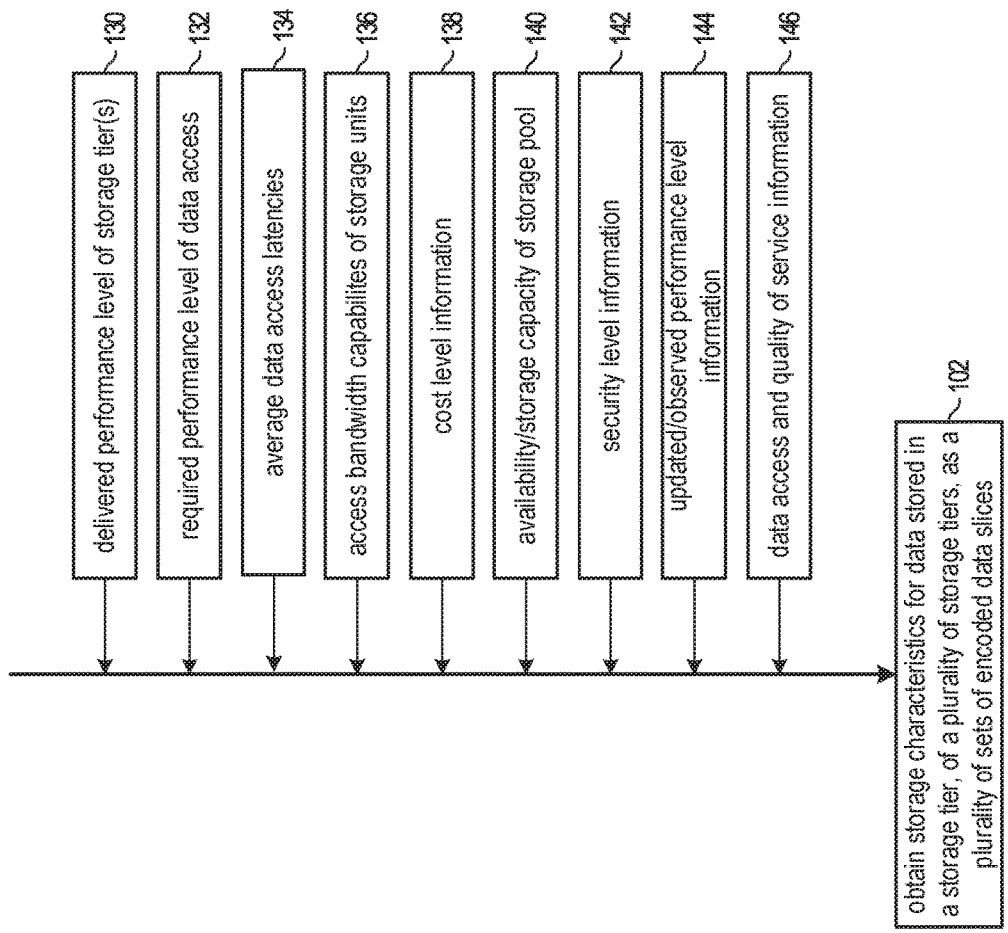
FIG. 11 is a flow diagram of obtaining storage characteristics relating to data stored in a tiered pool of storage units in accordance with an embodiment of the present disclosure.

FIG. 11 is a flow diagram of obtaining storage characteristics relating to data stored in a tiered pool of storage units in accordance with an embodiment of the present disclosure. In the illustrated example, a variety of storage characteristics for data stored in a storage tier is obtained (e.g., such as shown in step 102 of FIG. 10). Such storage characteristics can include: a delivered performance level of one or more storage tiers 130; a required performance level of data access 132; averaged data latency access information 134; access bandwidth capabilities of storage units of a storage pool 136; cost level information 138 relating to storage or migration of data; availability and storage capacity information for a storage pool 140; security level information 142; updated/observed performance level information 144; data access and quality of service information 146; etc. Other information, such as the identity of a data creator/requester and other meta-data associated with the data, may be determined. Such storage characteristics may be utilized by a computing device, for example, in determining whether to move data from one storage tier to another storage tier, selecting a target storage pool, determining whether to re-encode data, etc.

The methods described above in conjunction with the computing device 16 and storage units 36 can alternatively be performed by other modules (e.g., DS client modules 34) of a dispersed storage network or by other devices (e.g., managing unit 18). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions/program instructions can, when executed by one or more processing modules of one or more computing devices and/or by the storage units of the dispersed storage network (DSN), cause the one or more computing devices and/or the storage units to perform any or all of the method steps described above.

As may be used herein, the term "substantially" provides an industry-accepted tolerance for its corresponding term and/or relativity between items. Such an industry-accepted tolerance ranges from less than one percent to fifty percent. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagrams, can be implemented by special purpose hardware-based systems that perform the specified functions or acts or carry out combinations of special purpose hardware and computer instructions.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be one or more tangible devices that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage network, the method comprises:
   obtaining first storage characteristics relating to data stored in a first pool of storage units, the data stored as a set of encoded data slices and the first pool of storage units associated with a first storage tier;
   determining, based on the first storage characteristics, to move the data to a second storage tier;
   determining second storage characteristics relating to a target storage pool of storage units associated with a second storage tier;
   determining, based on the second storage characteristics, whether to re-encode the data for storage in the target storage pool of storage units;
   in response to determining not to re-encode the data:
   retrieving the set of encoded data slices;
   translating slice identifiers of the set of encoded data slices to translated slice identifiers; and
   generating a set of write requests, including the translated slice identifiers and the set of encoded data slices, for receipt by the target storage pool; and
   in response to determining to re-encode the data for storage in the target storage pool of storage units:
      retrieving at least a decode threshold number of encoded data slices of the set of encoded data slices;
      decoding, using first dispersed storage error coding function parameters, the decode threshold number of encoded data slices to produce a data segment;
      encoding, using second dispersed storage error coding function parameters, the data segment to produce a set of target slices;
      generating target slice identifiers; and
      generating a set of write requests, including the target slice identifiers and the set of target slices, for receipt by the target storage pool.

2. The method of claim 1, wherein the decode threshold number of encoded data slices to produce a data segment differs between the first dispersed storage error coding function parameters and the second dispersed storage error coding function parameters.

3. The method of claim 1, wherein the first storage characteristics include a delivered performance level associated with the first storage tier and a required performance level associated with the data, and wherein determining, based on the first storage characteristics, to move the data to a second storage tier includes indicating to move the data when the delivered performance level associated with the first storage tier compares unfavorably to the required performance level associated with the data.

4. The method of claim 3, wherein selecting a target storage pool of storage units includes determining that a delivered performance level associated with the second storage tier compares favorably to the required performance level associated with the data.

5. The method of claim 4, wherein the delivered performance level includes an access latency level.

6. The method of claim 1, wherein determining to move the data to a second storage tier comprises detecting a change in a required performance level associated with the data.

7. The method of claim 6, wherein detecting a change in a required performance level associated with the data is based on an estimated access frequency level relating to the data.

8. The method of claim 7, wherein detecting a change in a required performance level associated with the data is based on detecting data access activity.

9. A computer program product comprising a computer readable storage medium having program instructions embodied therewith, the program instructions executable by one or more processing modules to cause the one or more processing modules to:
   obtain first storage characteristics relating to data stored in a first pool of storage units, the data stored as a set of encoded data slices and the first pool of storage units associated with a first storage tier;
   determine, based on the first storage characteristics, to move the data to a second storage tier;
   determine second storage characteristics relating to a target storage pool of storage units associated with a second storage tier;
   determine, based on the second storage characteristics, whether to re-encode the data for storage in the target storage pool of storage units;
   in response to determining not to re-encode the data:
   retrieve the set of encoded data slices;
   translate slice identifiers of the set of encoded data slices to translated slice identifiers; and
   generate a set of write requests, including the translated slice identifiers and the set of encoded data slices, for receipt by the target storage pool; and
   in response to determining to re-encode the data for storage in the target storage pool of storage units:
      retrieve at least a decode threshold number of encoded data slices of the set of encoded data slices;
      decode, using first dispersed storage error coding function parameters, the decode threshold number of encoded data slices to produce a data segment;
      encode, using second dispersed storage error coding function parameters, the data segment to produce a set of target slices;
      generate target slice identifiers; and generate a set of write requests, including the target slice identifiers and the set of target slices, for receipt by the target storage pool.

10. The computer program product of claim 9, wherein the decode threshold number of encoded data slices to produce a data segment differs between the first dispersed storage error coding function parameters and the second dispersed storage error coding function parameters.

11. The computer program product of claim 9, wherein the first storage characteristics include a delivered performance level associated with the first storage tier and a required performance level associated with the data, and wherein determining, based on the first storage characteristics, to move the data to a second storage tier includes indicating to move the data when the delivered performance level associated with the first storage tier compares unfavorably to the required performance level associated with the data.

12. The computer program product of claim 11, wherein selecting a target storage pool of storage units includes determining that a delivered performance level associated with the second storage tier compares favorably to the required performance level associated with the data.

13. The computer program product of claim 9, wherein determining to move the data to a second storage tier comprises detecting a change in a performance level associated with the data.

14. A computing device comprises:
a network interface;
memory comprising instructions; and
a processing module in communication with the memory, wherein the processing module executes the instructions to:
obtain first storage characteristics relating to data stored in a first pool of storage units, the data stored as a set of encoded data slices and the first pool of storage units associated with a first storage tier;
determine, based on the first storage characteristics, to move the data to a second storage tier;
determine second storage characteristics relating to a target storage pool of storage units associated with a second storage tier;
determine, based on the second storage characteristics, whether to re-encode the data for storage in the target storage pool of storage units;
in response to determining not to re-encode the data:
retrieve the set of encoded data slices;
translate slice identifiers of the set of encoded data slices to translated slice identifiers; and
generate a set of write requests, including the translated slice identifiers and the set of encoded data slices, for receipt by the target storage pool; and
in response to determining to re-encode the data for storage in the target storage pool of storage units:
retrieve at least a decode threshold number of encoded data slices of the set of encoded data slices;
decode, using first dispersed storage error coding function parameters, the decode threshold number of encoded data slices to produce a data segment;
encode, using second dispersed storage error coding function parameters, the data segment to produce a set of target slices;
generate target slice identifiers; and
generate a set of write requests, including the target slice identifiers and the set of target slices, for receipt by the target storage pool.

15. The computing device of claim 14, wherein the decode threshold number of encoded data slices to produce a data segment differs between the first dispersed storage error coding function parameters and the second dispersed storage error coding function parameters.

16. The computing device of claim 14, wherein the first storage characteristics include a delivered performance level associated with the first storage tier and a required performance level associated with the data, and wherein determining, based on the first storage characteristics, to move the data to a second storage tier includes indicating to move the data when the delivered performance level associated with the first storage tier compares unfavorably to the required performance level associated with the data.

17. The computing device of claim 16, wherein selecting a target storage pool of storage units includes determining that a delivered performance level associated with the second storage tier compares favorably to the required performance level associated with the data.

* * * * *